(12) United States Patent
Sotgiu et al.

(10) Patent No.: US 8,739,624 B2
(45) Date of Patent: Jun. 3, 2014

(54) WHEEL BALANCER WITH MEANS FOR DETERMINING TYRE UNIFORMITY

(75) Inventors: Paolo Sotgiu, Modena (IT); Lillo Gucciardino, Bomporto (IT); Francesco Braghiroli, Reggio Emilia (IT)

(73) Assignee: Snap-On Equipment SRL a Unico Socio, Correggio (RE) (IT)

( * ) Notice: Subject to any disclaimer, the term of this patent is extended or adjusted under 35 U.S.C. 154(b) by 251 days.

(21) Appl. No.: 13/176,266

(22) Filed: Jul. 5, 2011

(65) Prior Publication Data
US 2013/0008249 A1 Jan. 10, 2013

(51) Int. Cl.
*G01M 1/08* (2006.01)
*G01M 1/22* (2006.01)
*G01M 1/38* (2006.01)

(52) U.S. Cl.
USPC ............................. 73/462; 73/468

(58) Field of Classification Search
USPC .................. 73/460, 462, 468, 146
See application file for complete search history.

(56) References Cited

U.S. PATENT DOCUMENTS

| | | | |
|---|---|---|---|
| 3,948,095 A | | 4/1976 | Burgett et al. |
| 4,352,291 A | * | 10/1982 | Curchod et al. ............... 73/462 |
| 4,366,707 A | * | 1/1983 | Jarschel ........................ 73/146 |
| 4,435,982 A | * | 3/1984 | Borner et al. ................. 73/462 |
| 4,457,172 A | * | 7/1984 | Mathes et al. ................. 73/462 |
| 4,480,472 A | * | 11/1984 | Wood ........................... 73/462 |
| 4,750,361 A | * | 6/1988 | Bandhopadhyay ........... 73/462 |
| 5,805,464 A | * | 9/1998 | Cameron et al. ............. 73/462 |
| 6,397,675 B1 | | 6/2002 | Colarelli, III et al. |
| 6,595,053 B2 | * | 7/2003 | Parker .......................... 73/462 |
| 8,250,915 B1 | * | 8/2012 | Voeller et al. ................. 73/460 |
| 2005/0081614 A1 | | 4/2005 | Zhu | |

FOREIGN PATENT DOCUMENTS

| | | |
|---|---|---|
| EP | 0 897 107 A2 | 2/1999 |
| EP | 1 731 891 A1 | 12/2006 |
| EP | 1 742 031 A1 | 1/2007 |
| EP | 1 785 712 A2 | 5/2007 |
| WO | WO 2008/138937 A2 | 11/2008 |

OTHER PUBLICATIONS

Extended European Search Report issued in European Patent Application No. 11 005 482.2 Dated Dec. 12, 2011.
European Examination Report for Application No. 11 00 482.2 dated Apr. 9, 2013.

\* cited by examiner

*Primary Examiner* — Helen Kwok
(74) *Attorney, Agent, or Firm* — McDermott Will & Emery LLP

(57) ABSTRACT

The present application relates to a wheel balancer which includes a stationary frame, a measuring shaft mounted rotatably about a shaft axis on the stationary frame and adapted to receive coaxially a rim/tyre assembly. The wheel balancer further includes an encoder configured to determine the angular positions of the measuring shaft or of the rim/tyre assembly, a load device configured to apply a load to the periphery of the rim/tyre assembly, a first measuring device configured to measure forces resulting from an unbalance of the rotating rim/tyre assembly, a second measuring device configured to measure forces acting between the load device and the periphery of the rim/tyre assembly, and a locking device configured to keep the distance between the shaft axis and a contact portion at which the periphery of the rim/tyre assembly contacts the load device constant during the measurement of the forces acting between the load device and the periphery of the rim/tyre assembly.

5 Claims, 2 Drawing Sheets

WHEEL BALANCER WITH MEANS FOR DETERMINING TYRE UNIFORMITY

BACKGROUND

The invention concerns a wheel balancer adapted to measure forces resulting from an unbalance of a rotating rim/tyre assembly, in particular a vehicle wheel, and a method for determining tyre uniformity performed on the wheel balancer.

Such a wheel balancer and such a method are known from EP 1 731 891 A1 and from EP 1 742 031 A1. The known wheel balancers are equipped with a load roller which is pressed against the peripheral surface of the tyre with predetermined force. During the rotation of the rim/tyre assembly the movement of the load roller is measured to determine the loaded radial runout of the rim/tyre assembly. Radial force variation can be measured wherein the load roller is rigidly mounted. Further, tyre stiffness is determined by applying at least two different loads to the load roller and measuring the change in deflection. A matching operation during which the tyre is remounted on the rim is disclosed in order to minimize vibration of the rotating rim/tyre assembly.

SUMMARY

An object of the invention is to provide a wheel balancer and a method for determining parameters of tyre uniformity with improved precision.

The problem is solved by means of a wheel balancer having the features of claim 1 and by means of a method having the features of claim 9. The dependent claims include preferable modifications and embodiments of the invention.

The invention provides a wheel balancer for balancing a rim/tyre assembly, having a measuring shaft mounted rotatably about its shaft axis on a stationary frame which can be the machine housing of the wheel balancer. Encoder means are operational connected to the measuring shaft for determining the angular positions of the measuring shaft or of the rim/tyre assembly. Measuring means measure forces resulting from an unbalance of the rotating rim/tyre assembly. Further, the wheel balancer is equipped with load means to apply a predetermined force to contact portions on the peripheral surface of the rim/tyre assembly, in particular to the tread of a vehicle wheel. The load means can include a load roller which is pressed with a predetermined force in the contact portions against the peripheral surface of the rim/tyre assembly. Another embodiment of the load means includes a load belt which is movably supported on support means having at least two rolls on which the belt is running and a support member backing up the belt in the region of contact with the peripheral surface of the rim/tyre assembly. A precise measurement of the forces created by non-uniformities of rim/tire assembly is achieved by keeping the measuring shaft and the load means in strained state to one another, wherein the strained condition is effected by the predetermined load and the forces acting in the contact portions between the load means and the rim/tire assembly. During the rotation of the loaded rim/tyre assembly, forces acting in the contact position at which the load means contacts the peripheral surface of the rim/tyre assembly are measured. During this measurement, the distance between the shaft axis of the measuring shaft and the contact portion is kept constant by appropriate locking means with which the shaft axis and the load means are locked in stationary positions on the stationary frame. With such a rigid measuring arrangement being in a strained state a precise measurement of the forces acting between the load means and the periphery of the rim/tyre assembly, especially the tyre is obtained. Clearances which result from tolerances and wear of the structural elements are eliminated by the strained state of the measuring arrangement.

The wheel balancer of the invention is designed to be used in garages for the maintenance and repair of vehicles.

The predetermined force or load can be applied by a relative translational movement between the load means and the rim/tyre assembly without any momentum acting onto the peripheral surface of the tyre.

According to an embodiment, a mounting device for rotatably mounting the measuring shaft can be moved along a straight line on the stationary frame towards the load means to allow an engagement of the peripheral surface of the rim/tyre assembly and of the load means. For the preferably vertical displacement of the mounting device, a linear drive, especially an electro mechanic drive or hydraulic/pneumatic piston-/cylinder drive can be provided. The mounting device is able to take several positions being differently spaced from the load means such that the respective peripheral surface of rim/tyre assembly with different diameters can be positioned in such a way that it engages the load means.

Alternatively or additionally, the load means, especially the roller can be moved along a straight line towards the measuring shaft to allow an engagement of the peripheral surface of the rim/tyre assembly and the load means. The roller or the load belt of the load means can be driven by an electro mechanic drive or hydraulic/pneumatic piston-/cylinder drive.

Preferably, a rotary drive, especially an electric motor and an associated transmission, is provided for rotating the rim/tyre assembly about the shaft axis. To detect uniformity of the tyre, the whole circumferential peripheral surface of the tyre is to be "scrolled". Such a drive is used also for performing the rotation of the rim/tyre assembly during the unbalance measurement.

The load roller or load belt of the load means can be driven by the friction between the peripheral surface of the rim/tyre assembly and roller or belt during the uniformity measurement. The load roller can be provided with associated drive means.

In particular, the load means, especially the load roller or the load belt are mounted in such a way that at least the radial force variations acting between the peripheral surface of the rim/tyre assembly and the load means are measured. The radial forces are the forces acting substantially perpendicularly to the axis of the tyre. Additionally, the axial or lateral forces can be measured, that means the forces acting substantially in the direction of the axis of the tyre. The force variation can be measured by at least one force sensor which is arranged in force locking manner within the force flux between the contact portion in which the forces are acting between the tyre and the load means and the measuring shaft, wherein the measuring shaft and the load means are kept by locking means in a constant distance to each other.

The force sensor can comprise a strain gauge, a piezo-quartz element and/or a Hall-element to measure the axial and/or radial forces. Any other known sensor can be used to detect lateral and/or radial forces.

In particular, the peripheral surface of the rim/tyre assembly is the tread surface of the tyre. According to the preferred embodiment, a rim with a tyre which can be used as a vehicle wheel is fixed to the measuring shaft of the mounting device and the wheel is positioned in such a way relative to the load means that the tread surface engages the load means. Afterwards, the wheel is rotated and the force variation between the tread surface and the load means are measured for detecting a non-uniformity of the rim/tyre assembly.

Preferably, electric signals corresponding to the force variation are sent by the force sensor to computing means. The computing means include analyzing components which analyze the signals and evaluates the uniformity or non-uniformity of the rim/tyre assembly.

The mounting device for the measuring shaft and/or the load means can be driven by a linear drive, especially by an electro mechanic drive to apply the predetermined force onto the peripheral surface of the rim/tyre assembly. Independently from the type of drive for the mounting device, the drive, in particular the linear drive can include the locking means, especially self-locking mechanical means which generate the relative movement between the mounting device and the load means and are connected rigidly to the mounting device and load means. The locking means can be designed to lock the shaft axis of the measuring shaft and the roller axis of the load roller or the support means of the load belt to a constant distance there between.

The force sensor can include a load cell or is designed as load cell providing an electric signal which is proportional to the force acting between the peripheral surface of the rim/tyre assembly and the load means. The load cell can be provided with a force feeling element which is linked by force locking to the roller or to the mounting device, wherein the physical effect created at the force feeling element is transformed into an electric signal. Appropriate load cells can include strain gauges, piezoelectric elements, Hall-elements and/or magneto-elastic elements.

The force sensor can be connected to or can include calibration means designed to determine absolute values of the forces acting between the peripheral surface of the rim/tyre assembly and the load means. These force values are proportional to the tyre stiffness and provide a precise determination of the tyre stiffness about the complete periphery (360°) of the tyre.

The wheel balancer can be provided with a scanning device designed to scan the lateral runout of one tyre side wall or both tyre side walls, particularly at the angular position of the roller or the belt of the load means.

The lateral runout is measured preferably while the load means engages the peripheral surface of the rim/tyre assembly. The lateral runout of the tyre can be measured also while the load means are out of engagement with the tyre. Further, the lateral runout can be measured with different inflation pressures of the tyre under loaded condition or under unloaded condition. The measured runout values can be used also to determine the tyre stiffness.

The wheel balancer can be provided with scanning devices to determine the radial rim runout and to determine the radial runout of the rim/tyre assembly. The measurement of the radial runout of the rim/tyre assembly can be performed under loaded condition and under unloaded condition. Further, the wheel balancer can be provided with an angular measuring device or encoder to determine the angular position of the rim/tyre assembly during its rotation, especially during the measurement of the force variation and of the several runout measurements. Additionally, the wheel balancer can be provided with matching means to remount the tyre on the rim. During the matching operation, high values of the force variations and low values of the radial rim runout along the periphery of the rim/tyre assembly are brought into angular positions in which vibrations caused by non-uniformities of the tyre and of the wheel rim are minimized.

At least one measured value of the force measurement and/or of the runout measurement can be compared with a respective predetermined force value or runout value for quality check.

The unbalance measurement on the rim/tyre assembly released from the load means is performed after the measurement of forces acting between the tyre and the load means, in particular after the matching operation.

An embodiment of the invention is a wheel balancer wherein the measuring shaft and/or the load means are driven by a linear drive, especially by an electro mechanic drive to apply the predetermined force onto the peripheral surface of the rim/tyre assembly.

A further embodiment is a wheel balancer having a computing means configured to compare a calculated force variation which depends on the measured geometrical parameters, especially radial runouts of the rim and the rim/tyre assembly, and on an average tyre stiffness associated to a specific tyre design or tyre type through 360° of rotation angle with the measured force variation measured in the loaded condition, and to vary the value of the average tyre stiffness in the calculated force variation until best matching of the measured and the calculated force variations is achieved to determine within 360° the local angular position of at least one difference between the measured and the calculated force variation. The value of said difference can be compared with a predetermined value.

BRIEF DESCRIPTION OF THE DRAWINGS

The invention is described in further detail hereinafter with reference to the Figures in which.

DETAILED DESCRIPTION

Figure 1:
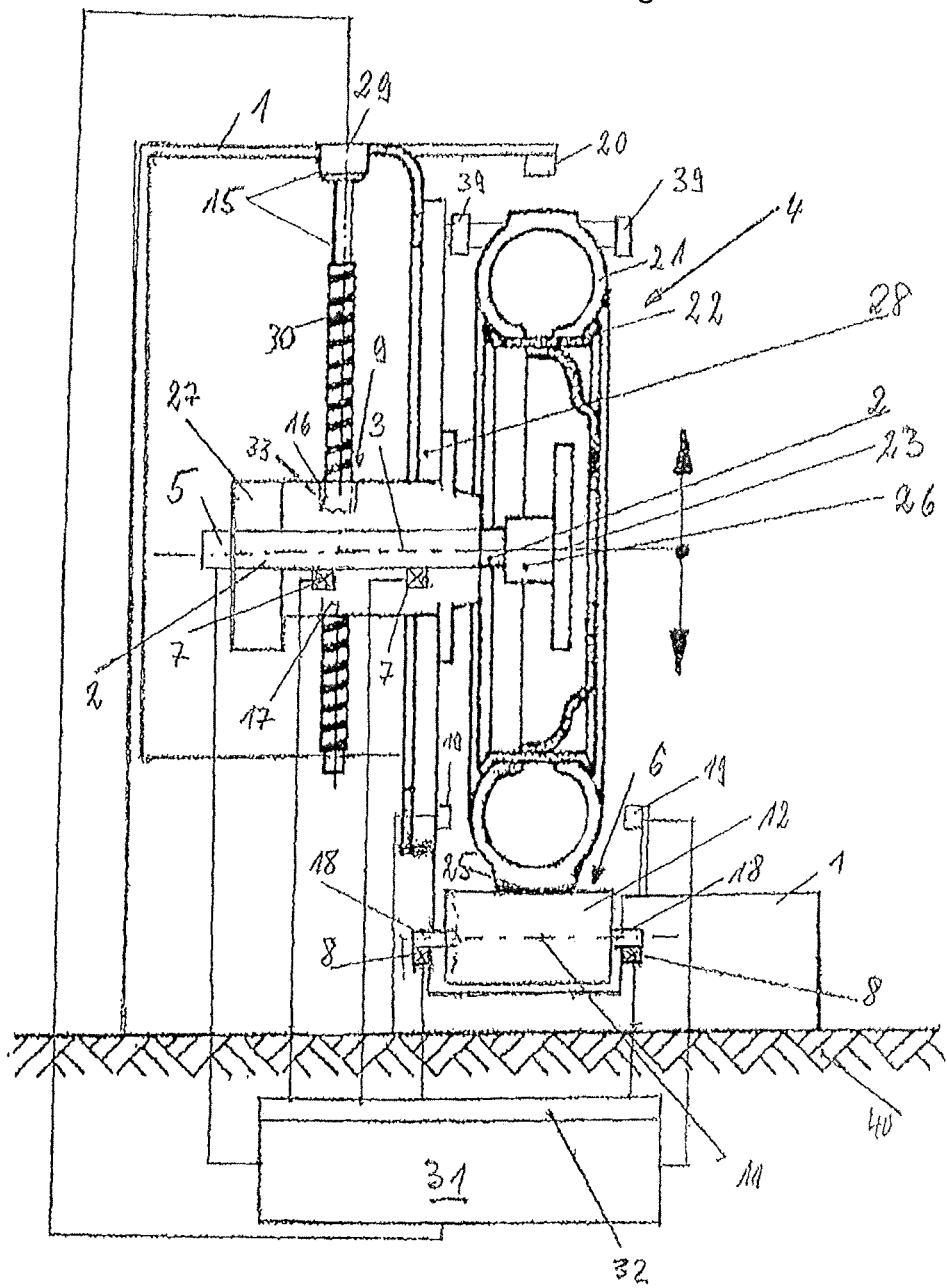
FIG. 1 shows schematically an embodiment of a wheel balancer according to the invention with a rim/tyre assembly and a load roller in a position in which the peripheral surface of the rim/tyre assembly engages the load roller.

In FIG. 1 illustrates a wheel balancer for balancing a rim/tyre assembly 4 consisting of a tyre 21 onto a rim 22 to establish a vehicle wheel.

The wheel balancer comprises a wheel fixing device 26 with which the wheel rim 22 is fixed to a measuring shaft 2. The measuring shaft 2 has a shaft axis 3 and being rotatable about the axis 3 by means of a rotary drive 27 which can include an electric motor and a transmission device to transmit the torque of the electric motor to the measuring shaft 2. The rim 22 is non-rotatably connected to the measuring shaft 2 by the fixing device 26 in particular with clamping means and is fixed in such a way that it is centered to the measuring shaft 2. A mounting device 17 supports rotatably the measuring shaft 2 in bearings which include force measuring means, in particular force sensors 7 for measuring forces resulting from an unbalance of the rotating rim/tyre assembly 4.

The mounting device 17 can be fixed in several vertical positions being differently spaced from a load means 6. The mounting device 17 is supported and guided on a stationary frame 1 or base frame for a linear movement, particularly in vertical direction. The stationary frame 1 which can be established by the machine housing of the wheel balancer includes vertical guiding means 28 which provides a force locking connection between the mounting device 17 and the stationary frame 1. The mounting device 17 can be stationary locked in its position by locking means 9 during the measurement. The mounting device 17 is driven by a linear drive 15 including an electric motor 29 and a threaded spindle 30 along which the mounting device 17 is moved as a siding carriage which is guided for a linear movement in the guiding means 28. One end of the threaded spindle 30 is drivenly connected to the drive 15 and the other end of the threaded spindle 30 is rotatably supported on the stationary frame 1. The drive is supported on the stationary frame 1.

The embodiment of FIG. 1 has load means 6 including a load roller 12 which is preferably in fixed position attached to a support member of the stationary frame 1. The load roller 12 is supported rotatably in roller bearings 18 which are rigidly fixed in the support member of the stationary frame 1.

The load roller 12 can rotate about its roller axis 11. In another not shown embodiment, the load roller 12 can be arranged in height-adjustable or horizontally adjustable manner wherein the bearing and supporting means of the load roller can be moved by means of a threaded spindle which is driven by an electric drive. The measuring shaft 2 is arranged in a fixed vertical position.

In FIG. 1, the mounting device 17 is shown in the position, in which a peripheral surface of the rim/tyre assembly in particular the tread surface engages the load roller 12. The mounting device 17 can be pushed with a predetermined force towards the roller 12 during the linear movement generated by the linear drive 15. A control section of computing means 31 is connected to the linear drive 15 and to force sensors 8 and controls the applied predetermined force. The predetermined force is transmitted directly to the peripheral surface of the rim/tyre assembly without any momentum. Furthermore, the force sensors 8 are further able to measure force variations acting between the tread surface and the load roller 12. The forces are acting in a contact portion 25 at which the peripheral surface of the rim/tyre assembly 4 contacts the load roller 12. In particular, the force sensors 8 are able to measure axial or lateral forces. Corresponding signals were sent to the computing means 31. Depending on the detected axial and radial force variations, non-uniformity or uniformity of the tread surface and of the tyre 21 can be determined.

The operation of the wheel balancer is as follows. The rim/tyre assembly 4 is centrally mounted on and fixed to the measuring shaft 2. Afterwards, the mounting device 17 is driven towards the load roller 12 as far as the tread surface of the rim/tyre assembly 4 engages the load roller 12. By means of the locking means 9, the mounting device 17 is stationary locked on the stationary frame 1 in its position during the measurement of the force variations. A predetermined force is acting between the load roller 12 and the peripheral surface of the rim/tyre assembly 4. The control section of the computing means controls the predetermined force. Then, the rim/tyre assembly 4 is rotated by the rotary drive 27 and the circumferential surface of the tyre 21 is "scrolled" by the load roller 12. Thereby, force variations or forces acting between the tread surface of the tyre 21 and the roller 12 in the contact portion 25 are measured. In particular, the force sensors measures the radial force variations, non-uniformity or uniformity of the tread surface, especially cone effects of the tyre 21 can be determined by analyzing components of the computing means 31.

For example a strain gauge can be part of each of the force sensor 8. The strain gauge is in force locking connection with each bearing 18 of the roller 12. Expansions and/or compressions of a force feeling element of the force sensor 8 caused by the forces in the radial and/or axial (lateral) direction influence the resistance of the strain gauge which can be detected as an electric signal and measured. Piezoelectric devices or Hall sensor or other force measuring devices can be used to measure the forces and force variations.

The load roller 18 can be supported by means of a common support for the bearings 8 and one force sensor 8 can be between the common support and the stationary frame 1, instead of the shown two force sensors 8. Further, the forces acting between the tyre 21 and the load means 6 can be detected additionally or alone by the force sensors 7 which are in force locking connection to the measuring shaft 2.

Alternatively, the mounting device 17 can be fixedly attached and unmovable to the stationary frame 1 and the load roller 12 can be moved by a linear drive in such a way that it is able to engage the tread surface of the tyre 21 to apply a predetermined force to the tread surface of the rim/tyre assembly 4. In its position, in which the roller 12 engages the tread surface, the roller 12 can be stationary locked during the measurement of the force variations by locking means. During the measurement, the distance between the roller axis 11 and the shaft axis 3 is kept constant by the locking means.

The locking means 9 may be provided between the roller mounting device 17 and the stationary frame 1. The mounting device 17 can be locked by known locking means like locking bolts. The locking means 9 keeps the distance between the shaft axis 3 and the contact portion 25 or the roller axis 11 constant. The self-locking means which are used in the embodiment of FIG. 1 will be explained below.

The operation of the force measuring equipment which is arranged on the wheel balancer will be explained in detail by referring to the FIGS. 1 and 2.

According to FIG. 1, the roller is supported by means of roller bearings 18 on a support member of the stationary frame 1. Each roller bearing 18 is provided with the force sensor 8 which includes a load cell or which is designed as a load cell arranged between the stationary frame 1 and the roller bearing 18. The load cell includes a force feeling element which is attached or rigidly connected on one side to the stationary frame 1 and on the other side to the roller bearing 18. The forces acting between the tyre 21 and load roller 12 influence the physical behaviour of the force feeling element, while the distance between the shaft axis 3 and the roller axis 11 or the contact portion 25 is kept constant during the force measurement. The rim/tyre assembly 4 is loaded by the roller 12 and rotates about its wheel axis 23 which is coaxial with the shaft axis 3. By means of such a measuring assembly, the spring forces of the tyre 21 are measured directly by the load cell or the force sensor 8, because the distance between the shaft axis 3 and the roller axis 11 is kept constant during the force measurement. The measuring assembly of the invention provides values of the spring forces of the tyre on each angular position around the periphery of the tyre. The value of the spring force of the tyre is proportional to the tyre stiffness.

The feeling element may be a deformable body provided with strain gauges whose electrical resistance is changed by a body deformation which can be bending, elongation, compression, etc. The force feeling element can be a magneto-elastic body whose deformation creates changes of electrical inductivity. Further, the force feeling element can be a piezo-quartz crystal or a Hall-element by means of which forces acting on it are transformed into an electrical voltage. Thus, the load cell or the force sensor is able to provide an electrical signal which is directly proportional to the forces acting between the load roller 12 and the tyre 21.

The force sensors 8 or the load cells can be connected to calibration means 32 designed to determine an absolute value of the force acting between the peripheral surface of the rim/tyre assembly 4 and the roller 12. In the embodiment of the FIG. 1, the calibration means 32 are integrated into the electronical equipment of the computing means 31, but the calibration means 32 can be incorporated in the force sensors 8 or the load cells.

In the embodiment of the FIG. 1, the mounting device 17 is driven by the linear drive 15, especially by an electro mechanic drive to apply the predetermined force onto the tread surface of the rim/tyre assembly 4 in the contact portion 25.

The linear drive 15 includes self-locking mechanical means 16 which transmit the rotary movement of the electric motor 29 to the mounting device 17. The self-locking mechanism includes threaded spindle 30 which is rotary driven by the motor 29. A thread of the spindle 30 engages into an internal thread 33 of the mounting device 17. During the rotation of the spindle 30, the mounting device 17 and the rim/tyre assembly 4 are moved along the guiding means 28 to the load roller 12 or away from the load roller 12. For the force measurement, the tyre 21 is pressed against the load roller 12, as shown in FIG. 1, and the self-locking means 16 lock the mounting device 17 and thus, the shaft axis 3 to a constant distance with respect to the roller axis 11. Instead of the self-locking means 16 provided by the thread of the spindle 30 and the internal thread 33 of the mounting device 17, other locking means, for instance bolts or the like can be used.

Figure 2:
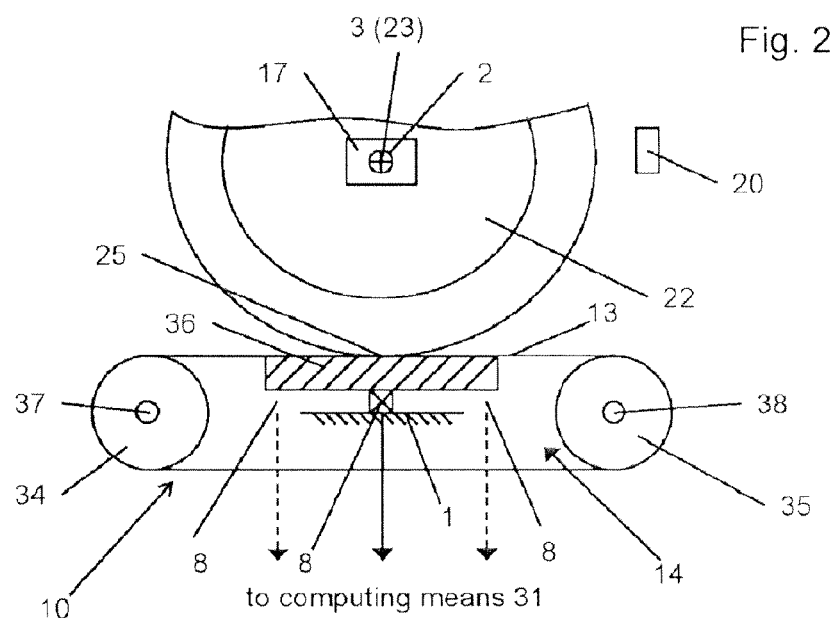
FIG. 2 shows an embodiment in which the load means include a load belt.

FIG. 2 illustrates another embodiment of a load means 10 which can be used instead of the load means 6 in the wheel balancer of FIG. 1. The load means 10 include a load belt 13 which is movably supported in support means 14 which are rigidly connected to the stationary frame 1. The support means include rolls 34, 35 around which the load belt 13 is rotatingly guided. The rolls 34, 35 are supported rotatably on the stationary frame 1 in rotary bearings 37, 38. In the area of the contact portion 25 in which the peripheral surface of the rim/tyre assembly 4 contacts the load belt 13 a support member 36 is provided. The support member 36 has a flat surface backing up the load belt 13 in the area of the contact portion 25. One force sensor 8 or load cell or two force sensors 8 (broken lines) or two load cells are on their one side in force locking contact with the support member 36 and on their other side rigidly supported on the stationary frame 1.

The components of the illustrated load means 6 (FIGS. 1) and 10 (FIG. 2) can be supported on the stationary frame 1 on which the mounting device 17 including the unbalance measuring equipment is vertically movable supported in force locking fashion. It is, however, possible to support the component of the load means 6 or 10 in a cavity of a fundament 40 to which the stationary frame 1 is connected in force locking fashion.

The mounting device 17 includes the unbalance measuring equipment, in particular the measuring shaft 2, the force sensors 7, encoder means 5 to determine the angular position of the shaft 2 and of the rim/tyre assembly 4 and the rotary device 27. The mounting device 17 can include additionally the computing means 31, but the computing means 31 can be arranged at another appropriate place within the stationary frame 1.

The wheel balancer can be provided with scanning devices 19 designed to scan the lateral runout of at least one tyre side wall, particularly at the angular position of the contact portion 25 in a condition in which the rim/tyre assembly 4 is loaded by the load means 6 or 10, as shown in FIGS. 1 and 2 or in which the tyre 21 is in a removed position from the load means 6 or 10. An appropriate contactless scanning device is described in U.S. Pat. No. 7,738,120 B2 in form of a sheet of light imaging system based on the principle of optical laser triangulation. The optical scanning device can have a light source that emits a light beam in a planar light beam shaped in a sheet of light or a planar light beam onto the wheel surface, in particular the side wall of the tyre and intersects the side wall surface in a plurality of impingement points along a stripe-shaped impingement area. At each of the impingement point, the light beams is scattered in a plurality of light rays that are reflected. At least a plurality of these reflected light rays will be then concentrated or focused by a lens system or input pupil into a stripe-shaped projected image area on a two-dimensional photosensitive sensor surface. The spacings and thus positions of the individual impingement points sensed at the wheel or the rim can then be determined by the triangulation method in dependence on the directions of the emitted and reflected light beams, particularly on the sensor signals. From the signals, the lateral runout of the tyre 21 on one side or on both sides can be determined. The scanning devices 19 are connected to the computing means 31 and the measured values around the periphery of the tyre 21 can be used for instance to determine the tyre stiffness.

Figure 3:
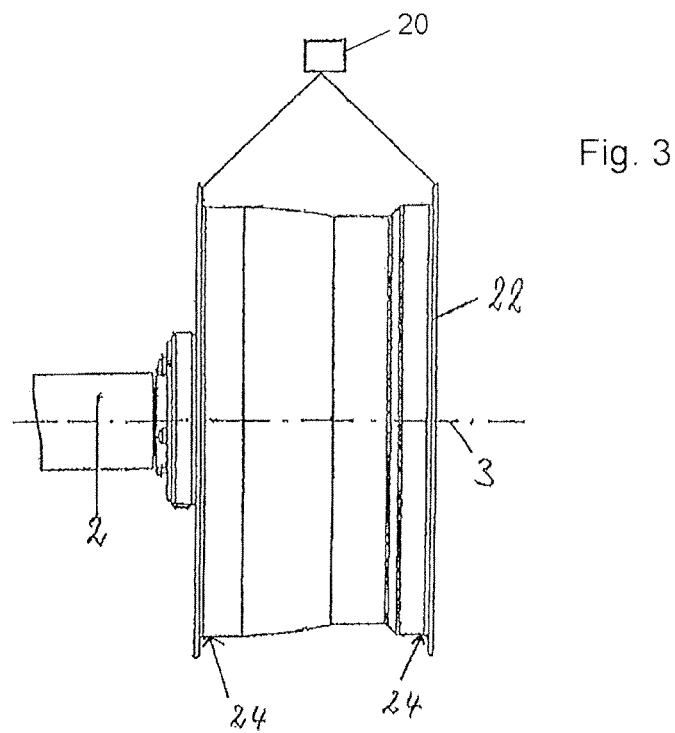
FIG. 3 shows the scanning of the peripheral surface of a rim.

The wheel balancer according to the shown embodiments includes an additional scanning device 20 emitting a light beam, especially laser beam in a planar plane to determine the radial runout of the rim/tyre assembly 4, as shown in FIG. 1. The scanning device 20 shown on the top of the stationary frame 1, but is preferably placed behind the rim/tyre assembly 4, whereas the light beam is emitted in horizontal planar plane passing through the wheel axis 23 (FIG. 2). Further, the scanning device 20 can be used to determine the runout of the rim 22, especially the runout of the outer peripheral surface of the rim 22, as shown in FIG. 3. The scanning device 20 has the same configuration as the above explained scanning device 19. The light beam of the scanning device 20 scans preferably the bead seat surface 24 of the rim 22 to determine the radial runouts on the peripheries of these surfaces.

Encoder means 5 are connected to the shaft 2 to determine the angular position of the rim/tyre assembly 4 during its rotation, especially during the measurement of the force variations and of its radial and lateral runouts, especially the runout of the tyre side walls. Further, the encoder means 5 determine the angular positions of the runouts on the outer periphery of the rim 22, in particular in the peripheral bead seat surfaces 24. The measuring signal is delivered to the computing means.

The wheel balancer according to another embodiment includes matching means to remount in cooperation with the computing means 31 the tyre 21 on the wheel rim 22 into angular positions in which high spots of the measured force variations or of the determined tyre stiffness and low spots of the measured radial rim runout, especially on the bead seat surfaces 24 of the rim 22, are brought into an angular positioning to each other that at least one of the match conditions are met: resulting vibrations or resulting radial force variations or radial runouts of the rim/tyre assembly are minimized. To achieve at least one of these conditions, the low spot of the radial rim runout, especially on the bead seat surfaces and the high spot of the force variation or of the determined tyre stiffness are brought substantially into the same angular position around the periphery of the rim/tyre assembly 4. The matching means can be designed as clamping surfaces of bead releasing tools 39 movably supported on the stationary frame 1 of the wheel balancer.

The matching operation is performed after the release of the tyre 21 from the peripheral surface of the load roller 12, wherein the mounting device 17 is moved upward by the linear drive 15.

The bead releasing tools 39 are pressed on the side walls of the tyre to release the tyre 21 on its both sides from the wheel rim 22, while the rim/tyre assembly 4 is rotated by the rotary device 27. The tyre is clamped between the tools 39 and kept in a stationary angular position. Under the control of the computing means 31 the rim 22 is rotated by the rotary drive 27 in the determined position in which at least one of the before explained match conditions are met. The matching operation can be performed also by means of the tools of a tyre changer.

The diameter of the load roller 12 is smaller than the diameter of the rim/tyre assembly 4 to be tested and can have 120 mm to 180 mm. The constant mean load which is applied by the load roller 12 or the load belt 13 onto the peripheral tyre surface is about 3 kN to 4 kN. The rotational speed during the force measurement is about 70 rpm to 100 rpm.

In order to perform the matching operation, the first harmonics of the measured force variations and of the measured rim runout are used to control the rotation of the shaft 2 with respect to the tyre 21 which is stationary fixed by the bead releasing tools 39. In order to get additional information of the tyre quality, higher harmonics can be determined during the forces measurement.

One advantage result of the matching procedure is the reduction of the unbalance of the rim/tyre assembly 4, so that the balancing mass which has to be applied to the rim/tyre assembly 4, especially to the vehicle wheel can be reduced. Thus, the measuring of the unbalance and the balancing operation are performed preferably after the measurement of the force variation and/or after the matching operation.

In a further embodiment, a computing means of the wheel balancer is configured to compare, through 360° of rotation angle, a measured force variation measured in loaded condition with a calculated force variation which depends on the measured geometrical parameters, especially radial runouts of the rim and the rim/tyre assembly, and on an average tyre stiffness associated to a specific tyre design or tyre type.

The function of the measured force variation $FV_M(\theta)$ in dependence on the rotation angle can be represented by the expression:

$$FV_M(\theta)=(R_{Ro}(\theta)+(W_{Ro}(\theta)-R_{Ro}(\theta)))\cdot 1/(1/K_R+1/K_T(\theta))$$

in which are:
$\theta$: angular position,
$FV_M(\theta)$ : measured force variation (variation in relation to its average value),
$R_{Ro}(\theta)$ : measured rim radial runout,
$W_{Ro}(\theta)$ : measured wheel (rim/tyre assembly) radial runout,
$K_R$: stiffness coefficient depending on rim material and assumed constant,
$K_T(\theta)$ : stiffness coefficient depending on tyre design and manufacturing quality.

The function of the calculated force variation $FV_C(\theta)$ in dependence on the rotation angle can be represented by the expression:

$$FV_C(\theta)=(R_{Ro}(\theta)+(W_{Ro}(\theta)-R_{Ro}(\theta)))\cdot 1(1/K_R+1/K_{Ta})$$

This expression allows the force variation calculation if it is considered depending on the geometrical parameters of the rim and the tyre, and independent of tyre stiffness variations caused by manufacturing quality, wherein a circumferential invariable average tyre stiffness $K_{Ta}$ is used.

The average tyre stiffness can be determined by a previous measurement or can be available from a data bank which provides respective values of the average tyre stiffnesses for specific tyre designs or tyre types. However, it is also possible to initially assume an arbitrary value for the average tyre stiffness $K_{Ta}$.

The value of the average tyre stiffness $K_{Ta}$ in the calculated force variation function $FV_C(\theta)$ is varied until best matching of the measured force variation function $FV_M(\theta)$ and the calculated force variation function $FV_C(\theta)$ is achieved to determine within 360° the local angular position of at least one difference between the measured and the calculated force variation functions. Consistent local differences between $FV_M(\theta)$ and $FV_C(\theta)$ are due to areas of tyre stiffness variations given by tyre manufacturing quality, and therefore tyre compound/structure defects can be found. Furthermore, the value of the respective difference can be compared with a predetermined value which represents the permitted tolerance for the tyre design or tyre type.

List of Reference Signs

| | |
|---|---|
| 1 | stationary frame |
| 2 | measuring shaft |
| 3 | shaft axis |
| 4 | rim/tyre assembly |
| 5 | encoder means |
| 6 | load means |
| 7 | force measuring means |
| 8 | force measuring means |
| 9 | locking means |
| 10 | load means |
| 11 | roller axis |
| 12 | load roller |
| 13 | load belt |
| 14 | support means |
| 15 | linear drive |
| 16 | self-locking mechanical means |
| 17 | mounting device tools |
| 18 | roller bearing |
| 19, 20 | scanning devices |
| 21 | tyre |
| 22 | rim |
| 23 | wheel axis |
| 24 | bead seat surfaces |
| 25 | contact portion |
| 26 | wheel mounting device |
| 27 | rotary device |
| 28 | guiding means |
| 29 | electric motor |
| 30 | threaded spindle |
| 31 | computing means |
| 32 | calibration means |
| 33 | internal thread |
| 34, 35 | rolls |
| 36 | support member |
| 37, 38 | rotary bearings |
| 39 | bead releasing |
| 40 | fundament |

The invention claimed is:

1. A method for determining tyre uniformity of a rim/tyre assembly including a tyre and a rim mounted on a measuring shaft of a wheel balancer adapted to measure forces resulting from an unbalance of the rotating rim/tyre assembly, the method comprising the steps:

rotating the rim/tyre assembly about a shaft axis of the measuring shaft and applying a predetermined force to contact portions at which the periphery of the rim/tire assembly contacts a load device in different angular positions about the shaft axis, wherein during the rotation, the measuring shaft and the load device are strained to one another by the applied predetermined load and forces acting in the contact portions in the different angular positions about the shaft axis, and the load device and the shaft axis are kept in stationary positions;

measuring the forces acting in the contact portions of a periphery of the rim/tyre assembly in the different angular positions;

measuring a runout of the rim/tyre assembly and a runout of the bead seat surfaces of the rim;

comparing a measured force variation measured in loaded condition through 360° of rotation angle with a calculated force variation which depends on the measured runout of the rim and of the rim/tyre assembly, and on an average tyre stiffness associated to a specific tyre design or tyre type; and varying the value of the average tyre stiffness in the calculated force variation until best matching of the measured and the calculated force variations is achieved to determine within 360° a local angular position of at least one difference between the measured and the calculated force variation.

2. The method according to claim 1, wherein the rim/tyre assembly is moved towards the load device to apply the predeteimined force to the periphery of the rim/tyre assembly.

3. The method according to claim 1, wherein the value of said difference is compared with a predetei mined value.

4. The method according to claim 1, wherein the tyre is remounted with respect to the rim, and wherein high and low spots of first harmonics of the measured force variations in the contact portions or of the tyre stiffness on periphery of the rim/tyre assembly and of the rim runout are matched to minimize, vibration or force variation of the rotating rim/tyre assembly.

5. The method according to claim 1, wherein forces resulting from an unbalance of the rotating rim/tyre assembly are measured after the measurement of the forces acting in the contact portion of the peripheral surface of the rim/tyre assembly.

* * * * *